(12) United States Patent
Saxena et al.

(10) Patent No.: US 12,391,803 B2
(45) Date of Patent: *Aug. 19, 2025

(54) SILICONE-COATED MINERAL WOOL INSULATION MATERIALS AND METHODS FOR MAKING AND USING THEM

(71) Applicant: CertainTeed LLC, Malvern, PA (US)

(72) Inventors: Pawan Saxena, Malvern, PA (US); Kevin J. Gallagher, Plymouth Meeting, PA (US); John J. Bozek, Harleysville, PA (US); Kathleen H. Saylor, Malvern, PA (US)

(73) Assignee: CertainTeed LLC, Malvern, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/242,285

(22) Filed: Sep. 5, 2023

(65) Prior Publication Data
US 2024/0067778 A1    Feb. 29, 2024

Related U.S. Application Data

(63) Continuation of application No. 16/386,086, filed on Apr. 16, 2019, now Pat. No. 11,746,192.

(Continued)

(51) Int. Cl.
| | |
|---|---|
| *C08G 77/26* | (2006.01) |
| *B05D 1/02* | (2006.01) |
| *B05D 7/24* | (2006.01) |
| *C03C 25/40* | (2006.01) |

(Continued)

(52) U.S. Cl.
CPC ............... *C08G 77/26* (2013.01); *B05D 1/02* (2013.01); *B05D 7/24* (2013.01); *C03C 25/40* (2013.01);

(Continued)

(58) Field of Classification Search
CPC .......... C08G 77/26; C08G 77/80; B05D 1/02; B05D 7/24; B05D 2203/35;

(Continued)

(56) References Cited

U.S. PATENT DOCUMENTS

| | | |
|---|---|---|
| 4,350,001 A | 9/1982 | Shishoo |
| 4,997,681 A | 3/1991 | Dockrill et al. |

(Continued)

FOREIGN PATENT DOCUMENTS

| | | | |
|---|---|---|---|
| CN | 1560158 A | * | 1/2005 |
| GB | 1235463 A | | 6/1971 |

(Continued)

OTHER PUBLICATIONS

International Seach Report and Written Opinion in International Patent Application PCT/US2019/027745, dated Oct. 24, 2019.

*Primary Examiner* — Robert S Walters, Jr.
(74) *Attorney, Agent, or Firm* — McDonnell Boehnen Hulbert & Berghoff LLP

(57) ABSTRACT

The present disclosure relates to silicone-coated mineral wool insulation materials, methods for making them using specific coating methods, and methods for using them. One aspect of the disclosure is a method for making a silicone-coated mineral wool, the method comprising: providing a mineral wool comprising a collection of mineral wool fibers; applying to the mineral wool a solvent-borne coating composition comprising a silicone, the silicone of the coating composition having a number-average molecular weight of at least 25 kDa; and allowing the solvent to evaporate to provide silicone-coated mineral wool.

19 Claims, 3 Drawing Sheets

Related U.S. Application Data

(60) Provisional application No. 62/658,547, filed on Apr. 16, 2018.

(51) Int. Cl.
  *C09D 183/04* (2006.01)
  *C09D 183/08* (2006.01)
  *D06M 15/643* (2006.01)
  *E04B 1/76* (2006.01)
  *E04B 1/78* (2006.01)
  *C08G 77/00* (2006.01)

(52) U.S. Cl.
  CPC ......... *C09D 183/04* (2013.01); *C09D 183/08* (2013.01); *D06M 15/643* (2013.01); *E04B 1/7604* (2013.01); *E04B 1/78* (2013.01); *B05D 2203/35* (2013.01); *B05D 2518/12* (2013.01); *C08G 77/80* (2013.01); *C08J 2383/08* (2013.01)

(58) Field of Classification Search
  CPC .. B05D 2518/12; C03C 25/40; C09D 183/04; C09D 183/08; D06M 15/643; E04B 1/7604; E04B 1/78; C08J 2383/08
  See application file for complete search history.

(56) References Cited

U.S. PATENT DOCUMENTS

| | | |
|---|---|---|
| 5,641,368 A | 6/1997 | Romes et al. |
| 6,562,257 B1 | 5/2003 | Chen et al. |
| 7,448,494 B2 | 11/2008 | LaSalle |
| 7,837,009 B2 | 11/2010 | Gross et al. |
| 11,746,192 B2 | 9/2023 | Saxena |
| 2001/0009834 A1 | 7/2001 | Peng |
| 2004/0038608 A1 | 2/2004 | Shaw et al. |
| 2008/0171201 A1 | 7/2008 | Houpt |
| 2009/0054580 A1 | 2/2009 | Joachim et al. |
| 2012/0168054 A1 | 7/2012 | Chen et al. |
| 2015/0183684 A1 | 7/2015 | Houpt et al. |
| 2015/0283577 A1 | 10/2015 | Zhang et al. |
| 2016/0368816 A1 | 12/2016 | Olang et al. |
| 2017/0198472 A1 | 7/2017 | Evans et al. |

FOREIGN PATENT DOCUMENTS

| | | |
|---|---|---|
| JP | H11-061109 A | 3/1999 |
| JP | 2004-211266 A | 7/2004 |
| WO | 200183394 A1 | 11/2001 |
| WO | 2012030909 A2 | 3/2012 |

\* cited by examiner

SILICONE-COATED MINERAL WOOL INSULATION MATERIALS AND METHODS FOR MAKING AND USING THEM

CROSS-REFERENCE TO RELATED APPLICATIONS

This application is a continuation of U.S. patent application Ser. No. 16/386,086, filed Apr. 16, 2019, which claims the benefit of priority of U.S. Provisional Patent Application No. 62/658,547, filed Apr. 16, 2018, which is hereby incorporated herein by reference in its entirety.-

BACKGROUND OF THE DISCLOSURE

1. Field of the Disclosure

The present disclosure relates generally to insulation materials and methods for making and using them. The present disclosure relates more particularly to silicone-coated mineral wool insulation materials, methods for making them using specific coating methods, and methods for using them.

2. Technical Background

Insulation materials such as mineral wool batts, rolls and blankets are typically used to reduce the rate of heat transfer between two areas separated by a boundary. For example, in an attic, insulation material can be applied to the interior surface of the roof deck to slow the transfer of heat through the roof deck, that is, from the exterior of the house to the attic or vice versa. In another application, insulation material is applied to exterior walls (e.g., between wood studs) and covered with wallboards to slow the rate of heat transfer through the exterior wall and the wallboard. Insulation material can also prevent undesirable air movement (e.g., convection drafts) and resultant movement of moisture from one space to another.

Mineral wool insulation materials are often formed in mat-like structures, with individual fibers being bound together in a non-woven structure by a binder. Such materials can be provided in the form of, e.g., blankets, batts or rolls, which can be disposed against building surfaces to insulate them. Such materials are typically disposed in attics (e.g., against a ceiling or a floor) or within walls to provide insulation.

More recently, the use of blowing wool or loose-fill insulation has increased in popularity. Loose-fill insulation is typically made up chiefly of non-bonded short mineral wool fibers, typically treated with additives such as dedusting oils and antistatic compounds. Loose-fill insulation is typically compressed and packaged into bags. Installation is performed (e.g., into attics and sidewalls) using a pneumatic blowing machine; the blowing process desirably uncompresses the loose-fill insulation to provide it with a desired low density.

Loose-fill insulation is popular with insulation contractors because it can be easily and quickly applied in both new construction as well as in existing structures. Further, loose-fill insulation is a relatively low-cost material, and has lower labor costs to install as compared to materials in the form of batts, blankets and rolls. However, loose-fill insulation is typically applied by contractors rather than homeowners because of the special blowing equipment needed. Such insulation is typically packaged in large bags weighing, e.g., 20-40 lbs.

When loose-fill insulations are pneumatically applied, they can be the source of dust and irritation for the installer. While dedusting oils are typically applied at the time of manufacture to control this dust, and the installers are advised to wear a dust mask and protective gear to reduce their exposure to dust, the effectiveness of these oils could be improved, especially when the oils are applied at low application rates (e.g., less than about 2% by weight).

Silicones are often applied to the fibers of mineral wool insulation materials. One reason to do so is to improve fiber-to-fiber lubricity. In loose-fill insulation, this helps the materials to decompress during blowing to provide a material having a relatively low density, and thus a relatively high area of coverage per unit weight. Silicone coatings also render the fiber surfaces hydrophobic, to help prevent water absorption and to protect the mineral material from hydrolytic attack.

But improvements in mineral wool insulation materials are still needed.

SUMMARY OF THE DISCLOSURE

One aspect of the disclosure is a method for making a silicone-coated mineral wool, the method comprising:
  providing a mineral wool comprising a collection of mineral fibers;
  applying to the mineral wool a solvent-borne coating composition comprising a silicone, the silicone of the coating composition having a number-average molecular weight of at least 20 kDa (e.g., at least 25 kDa); and
  allowing the solvent to evaporate to provide silicone-coated mineral wool.

Another aspect of the disclosure is a silicone-coated mineral wool made by a method as described herein.

Another aspect of the disclosure is a silicone-coated mineral wool comprising a mineral wool comprising collection of mineral wool fibers having a silicone coating comprising a silicone having a number average molecular weight of at least 20 kDa (e.g., at least 25 kDa).

Another aspect of the disclosure is an insulated structure having an interior surface (e.g., a surface of a wall, a ceiling, floor, an attic, a basement, or another building surface), and a silicone-coated mineral wool as described herein disposed against the interior surface.

Another aspect of the disclosure is an insulated structure having an interior surface and an exterior surface, and a silicone-coated mineral wool as described herein disposed in a space (e.g., partially or substantially filling the space) between the interior surface and the exterior surface.

Another aspect of the disclosure is an insulated cavity having a first surface and a second surface, and a silicone-coated mineral wool as described herein disposed in between the first surface and the second surface.

Additional aspects of the disclosure will be evident from the disclosure herein.

BRIEF DESCRIPTION OF THE DRAWINGS

The accompanying drawings are included to provide a further understanding of the methods and devices of the disclosure, and are incorporated in and constitute a part of this specification. The drawings are not necessarily to scale, and sizes of various elements may be distorted for clarity. The drawings illustrate one or more embodiment(s) of the disclosure, and together with the description serve to explain the principles and operation of the disclosure.

DETAILED DESCRIPTION

Figure 1:
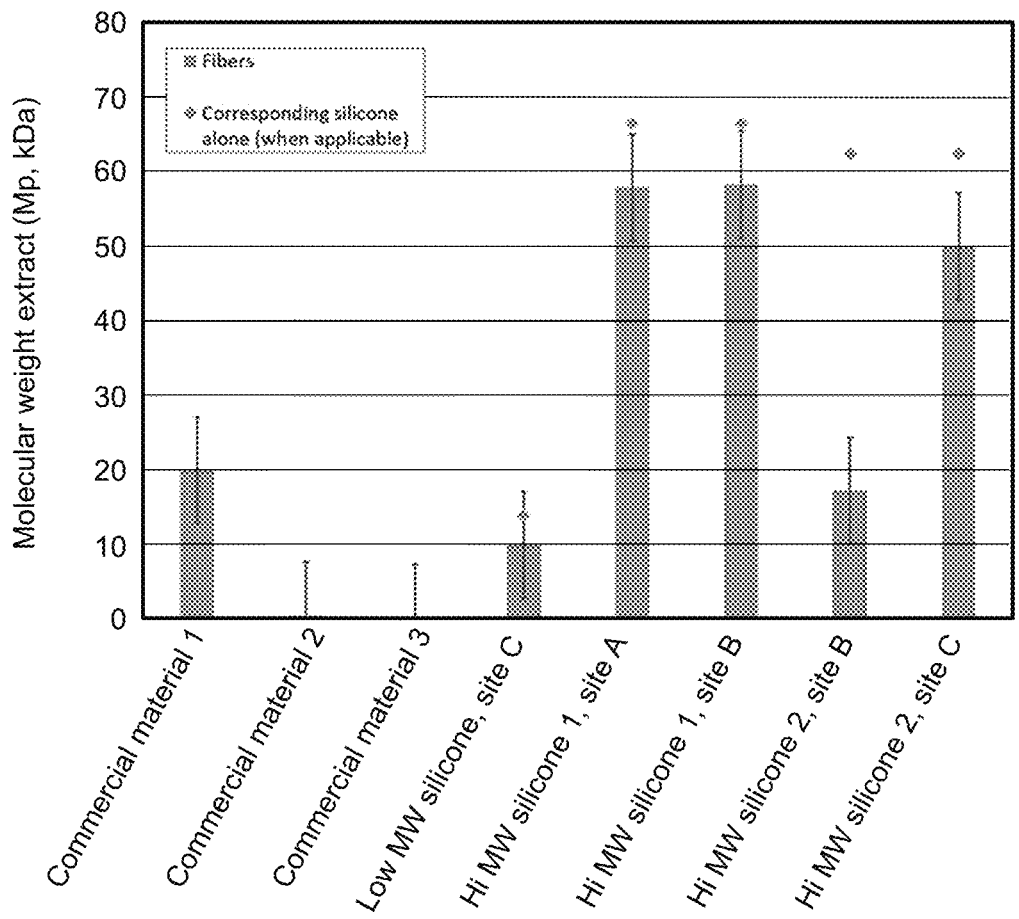
FIG. 1 is a bar graph showing measured peak molecular weights for various silicone materials.

As noted above, mineral wool materials are conventionally coated with a silicone in order to improve inter-fiber lubricity and provide the fibers with hydrophobic surfaces to help prevent moisture absorption by the material and to protect the fibers from hydrolytic attack. Conventionally, this coating is performed using an aqueous emulsion of a relatively low-molecular weight silicone, applied while the fibrous material is still hot from being spun or drawn from bulk material. Conventional silicones used for such purposes include, for example, silicones having a number-average molecular weight in the range of 10-15 kDa, e.g., Dow Corning DC 346 and Wacker Chemie BS1052.

The present inventors have unexpectedly determined that conventional silicone coating processes provide coated materials that suffer from a reduction in beneficial properties, especially during the first hour after coating. The present inventors have determined that the use of a high-molecular weight silicone can address the problem of silicone breakdown. Again, without intending to be bound by theory, the inventors surmise that such high-molecular weight silicones can undergo breakdown with roughly the same kinetics as the low-molecular weight silicones. But, critically, the resulting breakdown products would be of much higher molecular weight than those in the low molecular weight silicone case, and thus can be retained as a higher-quality coating on the fibers.

Accordingly, one aspect of the disclosure is a method for making a silicone-coated mineral wool material. The method includes providing a mineral wool comprising a collection of fibers; applying to the mineral wool a solvent-borne coating composition comprising a silicone; and allowing the solvent to evaporate to provide silicone-coated mineral wool. Notably, the silicone of the solvent-borne coating composition has a number-average molecular weight of at least 20 kDa. The mineral wool materials made by such processes can be especially useful as insulation materials, for example, as loose-fill insulation materials.

As the person of ordinary skill in the art will appreciate, the mineral wool can be made from a variety of materials. For example, in certain embodiments as otherwise described herein, the mineral wool is a glass wool. Glass wools can be made from a wide variety of glasses, for example, silicate glasses such as borosilicate glasses, aluminosilicate glasses and aluminoborosilicate glasses. Glass wools are frequently referred to as "fiberglass" in the art. In other embodiments, the mineral wool is a stone wool (also known as a rock wool), or a slag wool.

The fibers of the mineral wool are desirably relatively fine, so as to provide materials that can be installed by blowing to provide a relatively low density, and therefore a relatively high degree of insulation. Thus, in certain embodiments as otherwise described herein, the median diameter of the fibers of the mineral wool (i.e., taken for each fiber as the maximum distance across the fiber in a direction perpendicular to the length of the fiber) is no more than about 100 microns, e.g., no more than about 50 microns or even no more than about 20 microns. While relatively fine fibers are desired, in certain embodiments it is desirable for the fibers not to be too thin, so as not to create an inhalation hazard. Accordingly, in certain embodiments as otherwise described herein, the median diameter of the fibers of the mineral wool is at least 500 nm, e.g., at least 1 micron or at least two microns. The lengths of the fibers will vary, for example, depending on the desired end use of the material. In certain embodiments as otherwise described herein, the median length of the collection of fibers is no more than 500 mm, e.g., no more than 250 mm, or no more than 100 mm. For example, fibers made for use as loose-fill insulation will generally be relatively short. In certain embodiments, the median length of the collection of fibers is no more than 50 mm, e.g., no more than 25 mm, or even no more than 10 mm.

The mineral wool itself can be made using conventional methods, from a number of different materials, e.g., glass, rock or stone (e.g., basalt or diabase, or other volcanic or subvolcanic rock), an at least partially purified mineral, slag, or a mixture thereof. Typically, the mineral source is molten and formed into fibers, using any of a number of spinning, centrifugation, drawing, or other fiberizing processes. The fiberizing process itself can provide fibers of a desired length, or fibers can be chopped to a desired size. The resulting hot mineral fibers can then discharged from the fiberization apparatus and allowed to cool as one or more coatings or other treatments (including the silicones described herein) are applied thereto: the application of such coatings/treatments can help to cool down the hot mineral fibers. The cooled fibers can be collected, further treated if desired, and then packaged.

Silicones can be added while the fibers are still relatively hot, such that the solvent of the solvent-borne silicone can evaporate to help cool the fibers and to form the silicone coating as a layer of silicone on the surfaces of the fibers. The person of ordinary skill in the art will appreciate that the layer of silicone, especially when formed from droplets in a spray, may not be of a single uniform thickness, but rather may have significant variations in thickness and coverage on individual fibers and even on different areas of individual filers. Nonetheless, the amount of silicone on a collection of fibers can be characterized by an overall amount of silicone as a wt % of overall fiber mass. In certain embodiments as otherwise described herein, the mineral wool is at a temperature in range of 200-500° C. when it is coated with the solvent-borne coating composition. In certain such embodiments, the mineral wool is at a temperature in the range of 200-465° C., or 200-430° C., or 240-500° C., or 240-465° C., or 240-430° C., or 285-500° C., or 285-465° C., or 285-430° C. when it is coated with the solvent-borne coating composition. Upon coating, the solvent of the coating composition can begin to evaporate; this, along with the generally cooler temperature of the coating composition, can serve to cool the mineral wool and dry the silicone coating on the fibers of the mineral wool. Optionally, the mineral wool can be cooled somewhat (e.g., by spraying of a mist of water) before the application of the coating composition, in order to bring the mineral wool to a desired temperature for application of silicone. Upon application of the coating composition, evaporation of much of the solvent and the generally lower temperature of the coating composition can lower the temperature of the fibers, e.g., to a temperature in the range of 50° C. to 250° C. Thus, while the fibers are not as hot as they were before coating, they can still be still relatively hot.

Without intending to be bound by theory, the inventors surmise that the surface acidity/basicity of the mineral wool fibers is one important factor in the determination of ultimate material properties, especially due to the fact that the fibers typically remain relatively hot for some time after application of the silicone. Accordingly, in certain embodiments as otherwise described herein, the mineral wool (i.e., before being coated by the silicone) has a high surface basicity. Surface basicity can be determined by collecting the mineral wool (i.e., at the point in the process at which it is to be coated by the silicone), allowing it to cool, and performing the following pH soak test: The mineral wool (50 g) is combined with 1000 g of deionized water in a plastic jug. The jug is capped and shaken vigorously for 30 seconds. The glass wool sample is squeezed to drain any fluid into the jug, then liquid from the jug is filtered into a 250 mL beaker and the pH of the filtrate is measured using a pH meter to provide a soak test pH. In certain embodiments as otherwise described herein, the mineral wool has a soak test pH in the range of 8 to 11 just before it is coated. In certain such embodiments, the mineral wool has a soak test pH in the range of 8.5-11, or 8.5-10.5, or 8.5-10, or 9-11, or 9-10.5, or 9-10.

As described above, the present inventors have determined that it can be advantageous to use a high-molecular weight silicone in the coating of mineral wool fibers, especially at the temperatures and/or surface basicities described herein. Accordingly, in certain aspects of the disclosure, the silicone of the coating composition has a number-average molecular weight of at least 20 kDa. In certain embodiments as otherwise described herein, the silicone of the coating composition has a number-average molecular weight of at least 25 kDa, or at least 30 kDa, or at least 40 kDa, or at least 50 kDa, or at least 60 kDa. The person of ordinary skill in the art will understand that a variety of high molecular weight materials can be used, as long as they can be effectively coated from a solvent-borne coating composition.

A variety of silicones can be used in the methods and materials described herein. For example, in certain embodiments, the silicone is a polysiloxane, e.g., a polymer or copolymer of one or more of an alkylsiloxane such as dimethylsiloxane and methylsiloxane; and arylsiloxane such as phenylmethylsiloxane, 2-phenylpropylmethylsiloxane, and phenylsiloxane; and a functionalized siloxane such as 3-aminopropylmethylsiloxane, and aminoethylaminopropylmethoxysiloxane. In certain embodiments, the silicone is a poly(dimethylsiloxane). The silicone can be terminated in any convenient way, e.g., trimethylsilyl, hydroxy, or hydride.

The solvent-borne coating composition can be provided in a variety of forms, e.g., as an emulsion of the silicone in the solvent, or as a solution of the silicone in the solvent. (That is, the solvent need not actually dissolve the silicone; rather, it merely needs to provide an evaporable liquid carrier for the silicone.) In certain desirable embodiments, the solvent of the solvent-borne coating composition is an aqueous fluid, e.g., water. Water is environmentally benign, has a high heat capacity and heat of vaporization (and so provides efficient cooling of the hot mineral fibers), is not flammable, and is the base for many commercial silicone dispersions. But in some cases other solvents can be used. The concentration of the silicone in the coating composition can be, for example, in the range of 0.01-5% by weight. In certain embodiments, the concentration of the silicone in the coating composition is in the range of 0.01-5%, or 0.01-3%, or 0.01-2%, or 0.01-1%, or 0.01-0.5%, or 0.05-5%, or 0.05-3%, or 0.05-2%, or 0.05-1%, or 0.05-0.5%, or 0.1-5%, or 0.1-3%, or 0.1-2%, or 0.1-1%, or 0.1-0.5%.

Conventional coating methods can be used to apply the coating composition to the mineral wool. For example, in many conventional manufacturing methods, the fibers are formed then fall vertically through a cooling zone to be collected; the coating composition can be sprayed on the fibers of the mineral wool as they fall. The rate of spraying can be adjusted with respect to the rate of formation of the fibers to provide a desired amount of coating on the fibers. Of course, other application methods can be used. The rate of application (e.g., via spray) of the coating composition to the mineral wool (i.e., the amount that is conducted to the mineral wool, including any system losses) can be, for example, in the range of 0.1-10 mg silicone per gram mineral wool, e.g., in the range of 0.1-5, or 0.1-3, or 0.1-2, or 0.1-1, or 0.2-10, or 0.2-5, or 0.2-3, or 0.2-2, or 0.2-1, or 0.5-10, or 0.5-5, or 0.5-3, or 0.5-2 mg silicone per gram mineral wool.

The person of ordinary skill in the art will appreciate that not all of the silicone in the applied coating composition will initially be retained on the fibers; there are typically system losses that cause some fraction of the coating composition not to be picked up by the fibers. The amount of silicone on the fibers after spraying can in certain embodiments be, for example, in the range of 0.1-10 mg silicone per gram mineral wool, e.g., in the range of 0.1-5, or 0.1-3, or 0.1-2, or 0.1-1, or 0.2-10, or 0.2-5, or 0.2-3, or 0.2-2, or 0.2-1, or 0.5- 10, or 0.5-5, or 0.5-3, or 0.5-2 mg silicone per gram mineral wool.

Once the coating composition is applied, the solvent is allowed to evaporate to provide a silicone-coated mineral wool. The person of ordinary skill in the art will appreciate that in many systems, no especial arrangements need be made to evaporate the solvent; the temperature of the mineral wool at the time of coating, the temperature otherwise in the system, and flow of air or other process gas through the device is sufficient to evaporate the solvent. Of course, in other embodiments, the silicone-coated mineral wool can be heated or subjected to a flow of air or other process gas in order to evaporate the solvent. The silicone-coated mineral wool can be collected on, e.g., a conveyer as is conventional in the art.

The person of ordinary skill in the art will appreciate that a variety of other materials can be applied to the mineral wool. For example, an antistatic additive, such as a quaternary ammonium salt, can be applied to the mineral wool (e.g., by spray application from aqueous solution), in an amount effective to prevent static buildup in the final product.

Similarly, in many embodiments, a dedusting oil (e.g., a bright stock oil) can be applied to suppress dust in the final product. Oil can be provided, for example, in an amount within the range of 0.5-4% by weight of the mineral wool, e.g., about 2%. Conventional oils can be used, e.g., Telura™ 720E or Prorex 100 from Exxon-Mobil. A small amount (e.g., about 2% by weight) of surfactant (e.g., nonionic or cationic, such as a mono-, di- or tri-fatty acid ester) can be included in the oil.

The person of ordinary skill in the art will appreciate that these and other additional materials can be applied to the mineral wool in any desirable order. For example, in one embodiment, an antistatic additive is applied to the mineral wool after the silicone-containing composition is applied, and while the mineral wool is still warm, with the oil being applied after the mineral wool has cooled. But other embodiments are possible. In certain embodiments, one or more of these and other additional materials are applied at the same time as the silicone-containing coating composition (e.g., by being mixed into the silicone-containing coating composition, or by being applied at the same time as the silicone-containing coating composition). However, in other embodiments, substantially no other material is applied together with the silicone (i.e., the silicone-containing coating composition consists essentially of the silicone and the solvent).

In certain embodiments, the silicone-coated mineral wool is formed as an unbound loose-fill material, i.e., substantially no binder is applied to the silicone-coated mineral wool mineral wool. Such a material can be provided as relatively short fibers, suitable far installation using conventional loose-fill installation methods, e.g., by being blown through a hose for disposition against an interior surface of a building.

The silicone-coated mineral wool materials described herein can be packaged, e.g., by being compressed and packaged, e.g., into bags or other sealed containers.

Another aspect of the disclosure is a silicone-coated mineral wool made by a process as described herein.

Another aspect of the disclosure is a silicone-coated mineral wool comprising a mineral wool comprising collection of mineral wool fibers having a silicone coating comprising a silicone having a number average molecular weight of at least 20 kDa. The molecular weight of the silicone can be determined through matrix-assisted laser desorption ionization-time of flight secondary ion mass spectrometry (MALDI-TOF SIMS). In certain such embodiments, the silicone has a number-average molecular weight of at least 25 kDa, for example, at least 30 kDa, or at least 40 kDa, or at least 50 kDa, or at least 60 kDa, or at least 70 kDa. The molecular weight of the silicone used in the manufacture of such a mineral wool can be selected to provide the final product with a coating silicone having such molecular weights, taking into account a particular mineral material and manufacturing process. The use of a high-molecular weight silicone in the coating composition can provide silicone coatings of a substantially higher molecular weight, and thus a substantially higher quality than the conventional use of lower-molecular weight silicones.

The silicone-coated mineral wool according to this aspect of the disclosure can otherwise be substantially as described above with respect to the methods described above. And, in certain embodiments, the silicone-coated mineral wool according to this aspect of the disclosure can be made by a method as described herein.

The silicone-coated mineral wool materials described herein can be provided with a variety of densities, depending on the desired end use. For example, for use as insulation materials, the silicone-coated mineral wool materials can in some embodiments be provided with densities in the range of 0.1-20 lb/ft$^3$. In various embodiments, the silicone-coated mineral wool material has a density in the range of 0.25-8 lb/ft$^3$ (e.g., with the mineral wool being a glass wool); or 0.25-2 lb/ft$^3$ (e.g., with the mineral wool being in the form of a flexible building insulation material); or 0.25-0.75 lb/ft$^3$ (e.g., with the mineral wool being in the form of a flexible highly compressible building insulations); or 0.25-0.510 lb/ft$^3$ (e.g., with the mineral wool being in the form of a loose-fill insulation).

Figure 2:
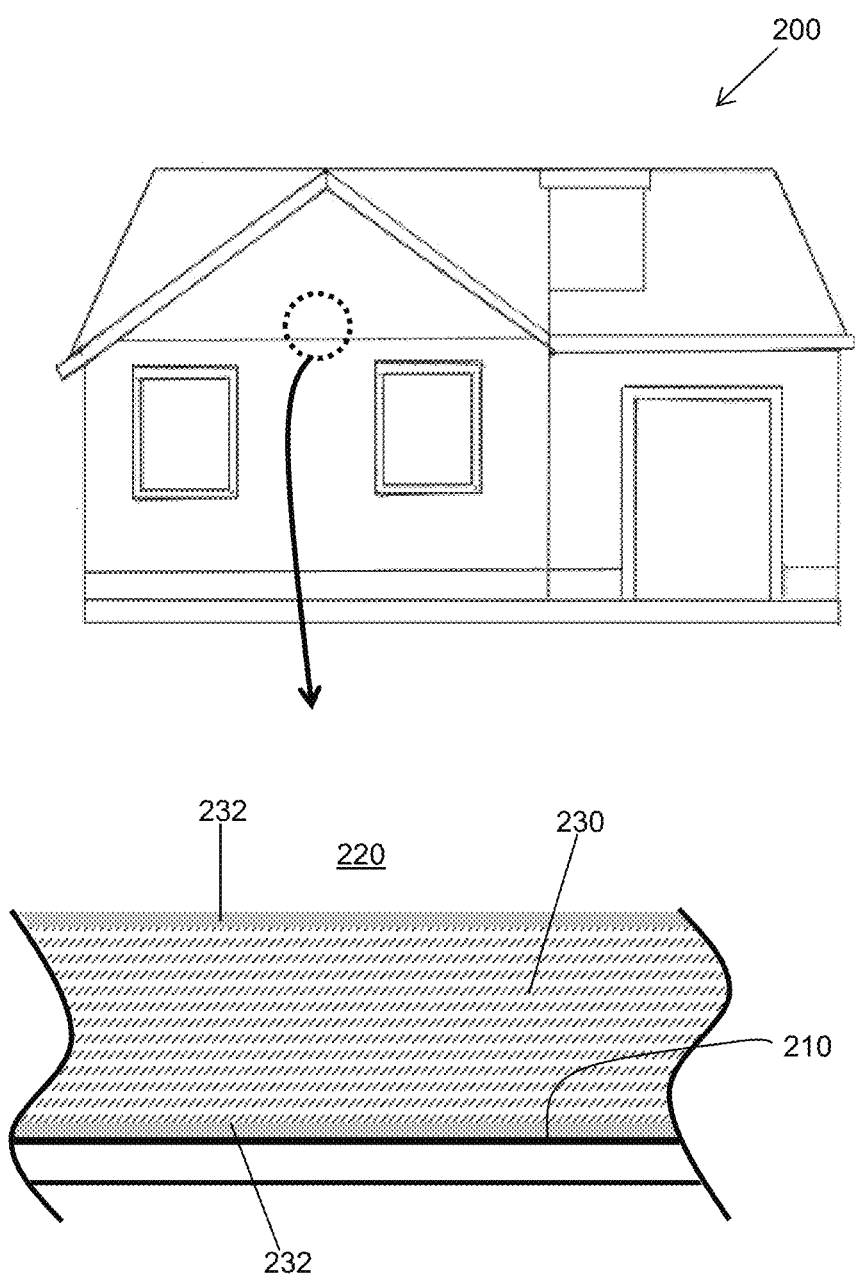
FIG. 2 is a schematic view of an insulated structure according to one embodiment of the disclosure.

The mineral wool materials described herein can advantageously be used as insulation materials in a variety of contexts, including insulation of building structures. Accordingly, another aspect of the disclosure is an insulated structure, the insulated structure having an interior surface (e.g., a surface of a wall, a ceiling, floor, an attic, a basement, or another building surface), and a silicone-coated mineral wool as described herein disposed against the interior surface. One such embodiment is shown in FIG. 2. Here, the insulated structure is house 200, of which an attic section is shown in detail. The interior surface is a ceiling surface 210 facing an attic 220, with a silicone-coated mineral wool 230 as described herein disposed against the interior surface. There can be one or more layers of liner between the silicone-coated mineral wool and the interior surface. For example, in this embodiment the silicone-coated mineral wool is in the form of an insulation batt, with liners 232 (e.g., formed from paper) encasing the mineral wool.

Figure 3:
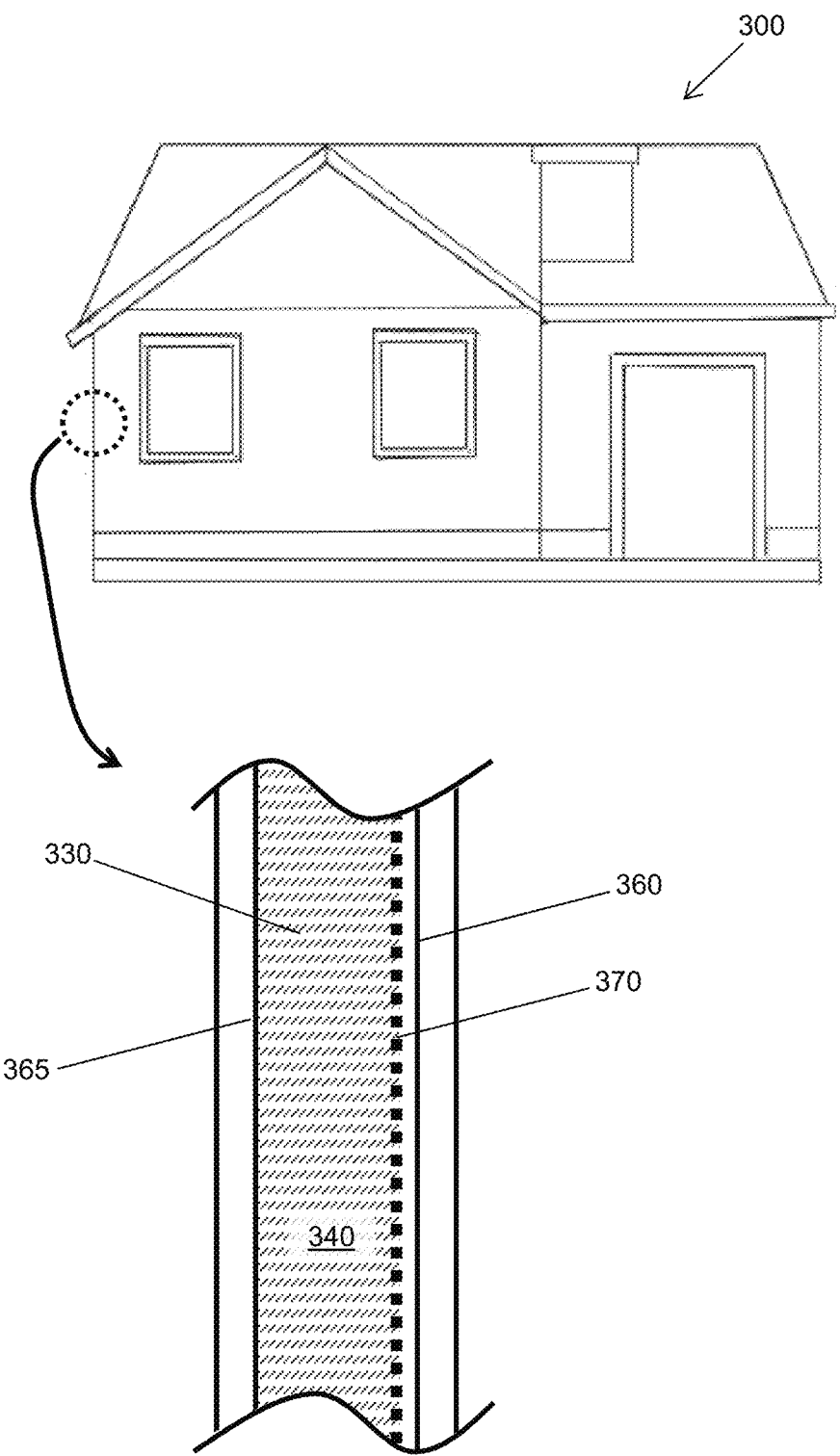
FIG. 3 is a schematic view of an insulated structure according to another embodiment of the disclosure.

For example, loose-fill materials as described herein can be used in so-called "blow-in-blanket" applications, in which a netting or other fabric encloses a cavity (e.g., in between wall studs) and a loose-fill insulation material is disposed in the enclosed cavity. Such an embodiment is shown in FIG. 3, in which an exterior wall structure of house 300 is shown in detail. Here, fabric 370 encloses a cavity 340 partially defined by exterior surface 365 (here, a surface of a sheathing). Loose-fill silicone-coated mineral wool 330 as described herein is disposed in the cavity defined by the fabric. Loose-fill materials can also advantageously be used in so-called "open-blow" applications, for example in which a loose-fill material is disposed loosely on an attic floor or above a ceiling of a structure (e.g. along an upward-facing surface, such as that described above with respect to FIG. 2).

Another aspect of the disclosure is an insulated structure (e.g., a building) having an interior surface and an exterior surface, and a silicone-coated mineral wool as described herein disposed in and at least partially filling a cavity between the interior surface and the exterior surface. The cavity can be, e.g., in a wall of the structure, a ceiling of the structure, or a floor of the structure. Such a structure is shown in FIG. 3, with the cavity being defined by the interior surface 360 (here, the surface of a wallboard) and the exterior surface 365. In certain such embodiments, the cavity is substantially (e.g., at least 90 vol %) filled by the loose-fill insulation material described herein. And another aspect of the disclosure is an insulated cavity having a first surface and a second surface, and a silicone-coated mineral wool as described herein disposed in between the first surface and the second surface.

Thus, the materials described herein can be used in insulating a variety of structures by being disposed in a cavity therein.

Loose-fill insulation materials described herein can be installed with relatively low densities, e.g., 0.25-0.510 lb/ft$^3$. Loose-fill insulation materials described herein can be installed using conventional methods, e.g., by blowing. Conventional blowing methods can be used. For example, in certain embodiments, the loose-fill insulation can be provided with an additive to help promote adhesion in and/or prevent flyaway from the site to be installed. For example, the loose-fill insulation can be blown with water (or some other evaporable liquid) to keep the material in place during the blowing operation; the liquid can evaporate after installation. In other embodiments, the additive can be an adhesive or a binder, e.g., to provide a more permanent adhesion. The person of ordinary skill in the art can use conventional materials in performing such methods.

The present inventors have observed a number of advantages from the use of a higher molecular weight silicone as described herein. For example, the mineral wool fibers can have high hydrophobicity. Moreover, the materials can have a lower density as installed when the silicone used to coat the fibers is of a higher molecular weight as described herein. This is especially important in the context of loose-fill insulation; such insulation is compressed for packaging, and the blowing process is used to decompress the material to a desired low density. As described below, the present inventors have determined that use of a higher molecular weight silicone leads to a material that can be blown to a lower density than a comparative material made with a lower molecular weight silicone. Without intending to be bound by theory, the inventors posit that this is due to increased silicone coverage leading to increased lubricity of the fibers, such that fibers can more easily slide against one another, leading to increased expansion of the material during blowing, and thus a lower density as installed.

And, surprisingly, these benefits can be observed even when much less silicone is used in the coating operation. The present inventors, as described below, determined that the performance of a material coated with high-molecular weight silicone can be better than a material coated with twice the amount of a lower molecular weight silicone.

In one set of experiments, glass fibers were coated while still hot (i.e., while falling from the spinning heads, temperature in the range of 285-430° C.) with an aqueous emulsion of silicone, then were conventionally treated with a quaternary ammonium salt and an oil, then compressed and packaged at about 8 lb/ft³ in conventional 31 lb bags. The control material was coated with a poly(dimethylsiloxane) having a number-average molecular weight of about 13.7 kDa ("Low MW Silicone"), from an 0.7 wt % emulsion in water, to spray a total amount of 0.14 wt % silicone to the fibers. Three experimental coatings were performed using a poly(dimethylsiloxane) having a nominal number-average molecular weight 62.7 kDa ("High MW Silicone 1")). Coatings were performed using the same concentration of silicone as in the control (to apply the same amount of silicone), as well as using half the concentration (to apply half the amount) and one-and-a-half times the concentration (to apply one-and-a-half times the amount). After different times of storage, the materials were blown at a depth of a foot and the coverage at one foot depth per two 31-lb bags was measured; this value is shown both as the coverage in square feet and as converted to a density (i.e., by the formula $$\text{density} = \frac{2 \times 31 \text{ lb}}{1 \text{ ft} \times \text{coverage area}}).$$

The table below provides density data for the control low-molecular weight-coated material and the three high-molecular weight-coated materials (i.e. at 0.5, 1.0, and 1.5 times the coating amount as compared to the control), as blown on the day of manufacture (0), and 14, 36, 62 and 90 days after manufacture. The data demonstrate that coating with the high-molecular weight material leads to lower densities, even when using half the amount of silicone.

evaporation. the residue was taken up in 10 mL tetrahydrofuran for permeation chromatography. The instrument was calibrated using polystyrene standards; error bars shown are the standard deviation of two injections of the same material on the chromatography system. In all cases, thermogravimetric analysis and time-resolved infrared spectroscopy confirmed that the extracted material was silicone. For experimental samples the silicone emulsion used to coat the fibers was also measured by evaporation of the emulsion solvent and taking up in tetrahydrofuran.

FIG. 1 is a bar graph showing molecular weight (Mp, mass of peak, Da) of coatings as measured by gel permeation chromatography (average of two runs, calibration with polystyrene standards). Data for the first run of each sample are also provided in the table below:

| Sample | Mp (Da) | Mn (Da) | Mw (Da) |
|---|---|---|---|
| Commercial sample 1 | 13000 | 17000 | 26000 |
| Commercial sample 2 | ~600 | — | — |
| Commercial sample 3 | ~300 | — | — |
| Low MW silicone, Site C | 14000 | 21000 | 42000 |
| High MW silicone 1, Site A | 57000 | — | — |
| High MW silicone 1, Site B | 60000 | 67000 | 112000 |
| High MW silicone 2, Site B, sample 1 (two GPC runs shown) | 18000 | 36000 | 77000 |
|  | 17000 | 32000 | 61000 |
| High MW silicone 2, Site B, sample 2 | 17000 | 28000 | 75000 |
| High MW silicone 2, Site C | 50000 | 81000 | 146000 |
| Low MW silicone emulsion | 14000 | 22000 | 41000 |
| High MW silicone 1 emulsion | 63000 | 71000 | 102000 |
| High MW silicone 2 emulsion | 82000 | 83000 | 119000 |

In FIG. 1 data are provided for three commercial materials, as well as five experimental samples coated as described in the first set of experiments described above. High MW Silicone 1 was measured to have a peak molecular weight (Mp) of about 67 kDa; fiber material coated therewith from the first site and a second site (sites A and B) had extracts having Mp values of about 58 kDa. High MW Silicone 2, a poly(dimethylsiloxane) silicone was measured to have an Mp value of about 62 kDa; fiber material coated therewith from a third site (site C) had an extract having a Mp value of about 50 kDa. At site B, however, the extract was only about 18 kDa. The Low MW Silicone was measured to provide a peak molecular weight of about 14 kDa; the corresponding fiber material, made at site C had an extract having a peak molecular weight of about 10 kDa.

In another set of experiments, coated fibers were collected on a weekly basis (collections seven days apart) from site B

| Time | 0 days | 14 days | 35 days | 62 days | 90 days |
|---|---|---|---|---|---|
| Control (low MW) | 139.6 ft² 0.444 lb/ft³ | 147.9 ft² 0.419 lb/ft³ | 151.9 ft² 0.408 lb/ft³ | 144.9 ft² 0.428 lb/ft³ | 159.8 ft² 0.388 lb/ft³ |
| 0.5x (high MW) | 156.6 ft² 0.396 lb/ft³ | 166.2 ft² 0.373 lb/ft³ | 165.3 ft² 0.375 lb/ft³ | 152.0 ft² 0.408 lb/ft³ | 167.1 ft² 0.371 lb/ft³ |
| 1.0x (high MW) | 152.7 ft² 0.406 lb/ft³ | 162.7 ft² 0.381 lb/ft³ | 145.2 ft² 0.427 lb/ft³ | 153.9 ft² 0.403 lb/ft³ | 160.6 ft² 0.386 lb/ft³ |
| 1.5x (high MW) | — | — | 160.6 ft² 0.386 lb/ft³ | — | 159.8 ft² 0.388 lb/ft³ |

Another set of experiments was performed to measure the molecular weight of a silicone coating on various silicone-coated mineral wools. The coatings were extracted using toluene (about 450 of solvent per about 60 g mineral wool) overnight; after filtration and drying of the filtrate via rotary and site C, and from two additional sites, site D and site E. During the multiweek set of collections, the silicone used was switched from a low molecular weight silicone to one of the higher-molecular weight silicones. Two 31-lb bags of product were collected at each collection: the material was blown at a depth of a foot and the coverage (in square feet) at one foot depth per two 31-lb bags was measured. Data are provided below.

Site B

| Low MW silicone | | High MW silicone 2 | |
|---|---|---|---|
| Week | coverage | week | coverage |
| 1 | 148.3 | 9 | 158.1 |
| 2 | 152.4 | 10 | 156.2 |
| 3 | 156.5 | 11 | 155.6 |
| 4 | 155.5 | 12 | 155.6 |
| 5 | 158 | 13 | 159.4 |
| 6 | 155.2 | 14 | 154.6 |
| 7 | 156.8 | 15 | 157 |
| 8 | 158.7 | 16 | 156.8 |
| avg | 155.2 | avg | 156.7 |

Site C

| Low MW silicone | | High MW silicone 2 | |
|---|---|---|---|
| Week | coverage | week | coverage |
| 1 | 152.1 | 7 | 161 |
| 2 | 155.53 | 8 | 158.96 |
| 3 | 156.55 | 9 | 158.37 |
| 4 | 157.09 | 10 | 159.55 |
| 5 | 159.93 | 11 | 157.98 |
| 6 | 159.89 | | |
| avg | 156.8 | avg | 159.2 |

Site D

| Low MW silicone | | High MW silicone 1 | |
|---|---|---|---|
| Week | coverage | week | coverage |
| 1 | 155.1 | 9 | 155.1 |
| 2 | 153.9 | 10 | 161.3 |
| 3 | 151 | 11 | 153.2 |
| 4 | 148.2 | 12 | 155.6 |
| 5 | 154.5 | 13 | 154.2 |
| 6 | 146.8 | 14 | 153.8 |
| 7 | 149 | 15 | 154.3 |
| 8 | 147.4 | 16 | 157.5 |
| avg | 150.7 | avg | 155.6 |

Site E

| Low MW silicone | | High MW silicone 1 | |
|---|---|---|---|
| Week | coverage | week | coverage |
| 1 | 165.14 | 9 | 165.11 |
| 2 | 167.03 | 10 | 172.9 |
| 3 | 168.32 | 11 | 168.88 |
| 4 | 165.2 | 12 | 160.53 |
| 5 | 163.7 | 13 | 163.03 |
| 6 | 158.09 | 14 | 154.2 |
| 7 | 159.5 | 15 | 161.05 |
| 8 | 153.24 | 16 | 164.11 |
| avg | 162.5 | avg | 163.7 |

These weekly data points can be confounded by the fact that process control is continually instituted in an effort to provide a product having a consistent coverage. To demonstrate effect at the time of the change, ten days' worth of data for Site C, High MW Silicone 2 are provided with the materials being sampled and tested multiple times a day. The silicone was changed between the low MW silicone and the high MW silicone 2 between days 5 and 6. The average coverage over days 1-5 was 157.6 ft$^2$, while the average coverage over days 6-10 was 163.8 ft$^2$.

Site C Low MW Silicone

| Day | Time | Coverage, ft$^2$/62 lb bag |
|---|---|---|
| 1 | 3:30 | 151.6 |
| 1 | 5:30 | 152.6 |
| 1 | 7:28 | 152.9 |
| 1 | 12:50 | 155.5 |
| 1 | 15:00 | 156.5 |
| 1 | 23:00 | 149.6 |
| 2 | 2:30 | 150.2 |
| 2 | 4:45 | 151.1 |
| 2 | 8:00 | 153.1 |
| 2 | 12:19 | 158.5 |
| 3 | 3:15 | 159.7 |
| 3 | 10:00 | 164.2 |
| 3 | 17:00 | 167.6 |
| 3 | 23:45 | 154.0 |
| 4 | 3:45 | 154.0 |
| 4 | 5:15 | 153.1 |
| 4 | 15:25 | 156.2 |
| 4 | 19:28 | 155.8 |
| 5 | 0:00 | 160.5 |
| 5 | 4:13 | 159.0 |
| 5 | 8:00 | 161.0 |
| 5 | 11:10 | 171.4 |
| 5 | 14:40 | 163.7 |
| 5 | 19:17 | 163.8 |
| 5 | 23:10 | 164.3 |
| Low MW avg | | 157.6 |

Site C High MW Silicone 2

| Day | Time | Coverage, ft$^2$/62 lb bag |
|---|---|---|
| 6 | 3:15 | 166.9 |
| 6 | 9:10 | 159.8 |
| 6 | 11:35 | 167.9 |
| 6 | 14:20 | 169.2 |
| 6 | 19:20 | 162.9 |
| 7 | 0:00 | 167.9 |
| 7 | 4:24 | 162.9 |
| 7 | 9:40 | 160.9 |
| 7 | 19:15 | 164.2 |
| 7 | 22:15 | 164.7 |
| 8 | 3:09 | 161.4 |
| 8 | 12:15 | 161.1 |
| 8 | 17:00 | 162.5 |
| 8 | 19:28 | 168.7 |
| 8 | 23:40 | 165.3 |
| 9 | 3:10 | 160.5 |
| 9 | 9:00 | 159.9 |
| 9 | 12:30 | 161.6 |
| 9 | 15:00 | 167.2 |
| 9 | 17:30 | 162.2 |
| 9 | 22:10 | 162.7 |
| 10 | 1:05 | 164.4 |
| 10 | 3:35 | 168.5 |
| 10 | 9:00 | 161.0 |
| 10 | 11:30 | 159.6 |
| High MW avg | | 163.8 |

Moreover, it has been found that materials made with the high molecular weight silicone exhibit much less tendency to clump when being handled for installation than the conventional materials made with low molecular weight silicones. This reduced clumping results in a number of operational advantages, including better uniformity of coverage, better flow during installation, and fewer blockages of delivery machinery and thus fewer stoppages during installation of the material.

Various aspects of the disclosure are provided by the following enumerated embodiments, which can be combined in any number and in any combination that is not logically or technically inconsistent.

Embodiment 1. A method for making a silicone-coated mineral wool, the method comprising:
providing a mineral wool comprising a collection of mineral wool fibers:
applying to the mineral wool a solvent-borne coating composition comprising a silicone, the silicone of the coating composition having a number-average molecular weight of at least 25 kDa: and
allowing the solvent to evaporate to provide silicone-coated mineral wool.

Embodiment 2. The method according to embodiment 1, wherein the mineral wool is a glass wool.

Embodiment 3. The method according to embodiment 1, wherein the mineral wool is a stone wool or a slag wool.

Embodiment 4. The method according to any of embodiments 1-3, wherein the median diameter of the fibers of the mineral wool (i.e., for each fiber, taken as the maximum distance across the fiber in a direction perpendicular to the length of the fiber) is no more than about 100 microns, e.g., no more than about 50 microns or even no more than about 20 microns.

Embodiment 5. The method according to any of embodiments 1-4, wherein the median length of the collection of fibers is no more than 500 mm, e.g., no more than 250 mm, or no more than 100 mm.

Embodiment 6. The method according to any of embodiments 1-5, wherein the mineral wool is at a temperature in range of 200-500° C. when it is coated with the solvent-borne coating composition.

Embodiment 7. The method according to any of embodiments 1-5, wherein the mineral wool is at a temperature in the range of 200-465° C., e.g., in the range of 200-430° C., or 240-500° C., or 240-465° C., or 240-430° C., or 285-500° C., or 285-465° C., or 285-430° C. when it is coated with the solvent-borne coating composition.

Embodiment 8. The method according to any of embodiments 1-7, wherein the mineral wool has a soak test pH in the range of 8 to 11 just before it is coated.

Embodiment 9. The method according to any of embodiments 1-7, wherein the mineral wool has a soak test pH in the range of 8.5-11, e.g., in the range of 8.5-10.5, or 8.5-10, or 9-11, or 9-10.5, or 9-10.

Embodiment 10. The method according to any of embodiments 1-9, wherein the silicone of the coating composition has a number-average molecular weight of at least 30 kDa.

Embodiment 11. The method according to any of embodiments 1-9, wherein the silicone of the coating composition has a number-average molecular weight of at least 40 kDa.

Embodiment 12. The method according to any of embodiments 1-9, wherein the silicone of the coating composition has a number-average molecular weight of at least 50 kDa.

Embodiment 13. The method according to any of embodiments 1-9, wherein the silicone of the coating composition has a number-average molecular weight of at least 60 kDa.

Embodiment 14. The method according to any of embodiments 1-9, wherein the silicone of the coating composition has a number-average molecular weight of at least 70 kDa.

Embodiment 15. The method according to any of embodiments 1-14, wherein the silicone is a polysiloxane.

Embodiment 16. The method according to embodiment 15, wherein the silicone is a poly(dimethylsiloxane).

Embodiment 17. The method according to embodiment 15, wherein the silicone is a polymer or copolymer of one or more of an alkylsiloxane such as dimethylsiloxane and methylsiloxane; and arylsiloxane such as phenylmethylsiloxane 2-phenylpropylmethylsiloxane, and phenylsiloxane: and a functionalized siloxane such as 3-aminopropylmethylsiloxane.

Embodiment 18. The method according to embodiment 17, wherein the polymer or copolymer includes a functionalized siloxane such as 3-aminopropylmethylsiloxane.

Embodiment 19. The method according to any of embodiments 1-18, wherein the solvent of the solvent-borne coating composition is an aqueous solvent, e.g., water.

Embodiment 20. The method according to embodiment 19, wherein the silicone is provided as an emulsion in the solvent.

Embodiment 21. The method according to any of embodiments 1-20, wherein the concentration of the silicone in the coating composition is in the range of 0.1-5% by weight.

Embodiment 22. The method according to any of embodiments 1-21, wherein the rate of application of the coating composition to the mineral wool is in the range of 0.1-10 mg silicone per gram mineral wool.

Embodiment 23. The method according to any of embodiments 1-22, wherein the rate of application of the coating composition to the mineral wool is in the range 0.1-5, e.g., in the range of 0.1-3, or 0.1-2, or 0.1-1, or 0.2-10, or 0.2-5, or 0.2-3, or 0.2-2, or 0.2-1, or 0.5- 10, or 0.5-5, or 0.5-3, or 0.5-2 mg silicone per gram mineral wool.

Embodiment 24. The method according to any of embodiments 1-23, wherein the application of the solvent-borne coating composition to the mineral wool lowers the temperature of the mineral wool to in the range of 50° C. to 250° C.

Embodiment 25. The method according to any of embodiments 1-24, wherein the amount of silicone on the fibers after spraying is in the range of 0.1-10 mg silicone per gram mineral wool.

Embodiment 26. The method according to any of embodiments 1-24, wherein the amount of silicone on the fibers after spraying is in the range of 0.1-5, e.g., in the range of 0.1-3, or 0.1-2, or 0.1-1, or 0.2-10, or 0.2-5, or 0.2-3, or 0.2-2, or 0.2-1, or 0.5-10, or 0.5-5, or 0.5-3, or 0.5-2 mg silicone per gram mineral wool.

Embodiment 27. The method according to any of embodiments 1-26, further comprising applying an effective amount of an antistatic additive (e.g., a quaternary ammonium salt) to the mineral wool.

Embodiment 28. The method according to any of embodiments 1-27, further comprising applying a dedusting oil to the mineral wool in an amount in the range of 0.4-4% by weight of the mineral wool.

Embodiment 29. The method according to any of embodiments 1-28, wherein the silicone-coated mineral wool is formed as an unbound loose-fill material.

Embodiment 30. The method according to any of embodiments 1-29, further comprising compressing the silicone-coated mineral wool and packaging it in a sealed container.

Embodiment 31. A silicone-coated mineral wool comprising a mineral wool comprising collection of mineral wool fibers having a silicone coating comprising a silicone having a number average molecular weight of at least 25 kDa.

Embodiment 32. The silicone-coated mineral wool according to embodiment 31, wherein the silicone has a number-average molecular weight of at least 30 kDa.

Embodiment 33. The silicone-coated mineral wool according to embodiment 31, wherein the silicone has a number-average molecular weight of at least 40 kDa.

Embodiment 34. The silicone-coated mineral wool according to embodiment 31, wherein the silicone has a number-average molecular weight of at least 50 kDa.

Embodiment 35. The silicone-coated mineral wool according to embodiment 31, wherein the silicone has a number-average molecular weight of at least 60 kDa.

Embodiment 36. The silicone-coated mineral wool according to embodiment 31, wherein the silicone has a number-average molecular weight of at least 70 kDa.

Embodiment 37. The silicone-coated mineral wool according to any of embodiments 31-36, wherein the mineral wool is a glass wool.

Embodiment 38. The silicone-coated mineral wool according to any of embodiments 31-36, wherein the mineral wool is a stone wool or a slag wool.

Embodiment 39. The silicone-coated mineral wool according to any of embodiments 31-38, wherein the median diameter of the fibers of the mineral wool (i.e., for each fiber, taken as the maximum distance across the fiber in a direction perpendicular to the length of the fiber) is no more than about 100 microns, e.g., no more than about 50 microns or even no more than about 20 microns.

Embodiment 40. The silicone-coated mineral wool according to any of embodiments 31-39, wherein the median length of the collection of fibers is no more than 500 mm, e.g., no more than 250 mm, or no more than 100 mm.

Embodiment 41. The silicone-coated mineral wool according to any of embodiments 31-39, wherein the median length of the collection of fibers is no more than 50 mm, e.g., no more than 25 mm, or no more than 10 mm.

Embodiment 42. The silicone-coated mineral wool according to any of embodiments 31-40, wherein the silicone is a polysiloxane, e.g., a poly(dimethylsiloxane).

Embodiment 43. The silicone-coated mineral wool according to embodiment 42, wherein the silicone is a polymer or copolymer of one or more of an alkylsiloxane such as dimethylsiloxane and methylsiloxane; and arylsiloxane such as phenylmethylsiloxane 2-phenylpropylmethylsiloxane, and phenylsiloxane; and a functionalized siloxane such as 3-aminopropylmethylsiloxane.

Embodiment 44. The silicone-coated mineral wool according to embodiment 43, wherein the polymer or copolymer includes a functionalized siloxane such as 3-aminopropylmethylsiloxane.

Embodiment 45. The silicone-coated mineral wool according to any of embodiments 31-44, wherein the amount of silicone on the fibers is in the range of 0.1-10 mg silicone per gram mineral wool.

Embodiment 46. The silicone-coated mineral wool according to any of embodiments 31-44, wherein the amount of silicone on the fibers is in the range of 0.1-10, e.g., in the range of 0.1-5, e.g., in the range of 0.1-3, 0.1-2, or 0.1-1, or 0.2-10, or 0.2-5, or 0.2-3, or 0.2-2. or 0.2-1, or 0.5-10, or 0.5-5, or 0.5-3. or 0.5-2 mg silicone per gram mineral wool.

Embodiment 47. The silicone-coated mineral wool according to any of embodiments 31-46, further comprising an effective amount of an antistatic additive (e.g., a quaternary ammonium salt).

Embodiment 48. The silicone-coated mineral wool according to any of embodiments 31-47, further comprising a dedusting oil on the mineral wool in an amount in the range of 0.4-4% by weight of the mineral wool.

Embodiment 49. The silicone-coated mineral wool according to any of embodiments 31-48, wherein the silicone-coated mineral wool is formed as an unbound loose-fill material.

Embodiment 50. The silicone-coated mineral wool according to any of embodiments 31-49, compressed and packaged in a sealed container.

Embodiment 51. The silicone-coated mineral wool according to any of embodiments 31-50, made by a method according to any of embodiments 1-30.

Embodiment 52. A silicone-coated mineral wool made by a method according to any of embodiments 1-30.

Embodiment 53. An insulated structure having an interior surface (e.g., a surface of a wall, a ceiling, floor, an attic, a basement, or another building surface), and a silicone-coated mineral wool according to any of embodiments 31-52 disposed against the interior surface.

Embodiment 54. The insulated structure according to embodiment 53, wherein the interior surface is an upward-facing surface of an attic floor or above a ceiling of a structure.

Embodiment 55. An insulated structure having an interior surface and an exterior surface, and a silicone-coated mineral wool according to any of embodiments 31-52 disposed in and at least partially filling a cavity between the interior surface and the exterior surface.

Embodiment 56. An insulated structure having an interior surface and an exterior surface, and a silicone-coated mineral wool according to any of embodiments 31-52 disposed in and substantially filling a cavity between the interior surface and the exterior surface.

Embodiment 57. An insulated cavity having an interior surface and an exterior surface, and a silicone-coated mineral wool according to any of embodiments 31-52 disposed in and a least partially filling (e.g., substantially filling) the cavity between the interior surface and the exterior surface.

Embodiment 58. The insulated cavity or structure according to any of embodiments 53-57, wherein the silicone-coated mineral wool has a density of 0.25-0.510 lb/ft$^3$.

It will be apparent to those skilled in the art that various modifications and variations can be made to the processes and devices described here without departing from the scope of the disclosure. Thus, it is intended that the present disclosure cover such modifications and variations of this invention provided they come within the scope of the appended embodiments and their equivalents.

What is claimed is:

1. A method for making an unbound loose-fill silicone-coated mineral wool, the method comprising:
providing a loose-fill mineral wool comprising a collection of loose mineral wool fibers;
applying to the loose-fill mineral wool a solvent-borne coating composition comprising a silicone, the silicone of the coating composition having a number-average molecular weight of at least 40 kDa; and allowing the solvent to evaporate to provide silicone-coated mineral wool, wherein the rate of application of the coating composition to the mineral wool is in the range of 0.1-10 mg silicone per gram mineral wool, wherein the mineral wool is at a temperature in range of 200-500° C. when it is coated with the solvent-borne coating composition.

2. The method according to claim 1, wherein the mineral wool is a glass wool.

3. The method according to claim 1, wherein the mineral wool is at a temperature in range of 285-500° C. when it is coated with the solvent-borne coating composition.

4. The method according to claim 1, wherein the mineral wool has a soak test pH in the range of 8 to 11 just before it is coated.

5. The method according to claim 1, wherein the amount of silicone on the fibers after application is in the range of 0.1-5 mg silicone per gram mineral wool.

6. The method according to claim 1, wherein the amount of silicone on the fibers after application is in the range of 0.1-2 mg silicone per gram mineral wool.

7. The method according to claim 1, wherein the amount of silicone on the fibers after application is in the range of 0.2-10 mg silicone per gram mineral wool.

8. The method according to claim 1, wherein the silicone of the coating composition has a number-average molecular weight of at least 60 kDa.

9. The method according to claim 1, wherein the silicone is a poly(dimethylsiloxane).

10. The method according to claim 1, wherein the silicone is a polymer or copolymer of one or more of an alkylsiloxane; and arylsiloxane; and a functionalized siloxane.

11. The method according to claim 1, wherein the concentration of the silicone in the coating composition is in the range of 0.01-5% by weight.

12. The method according to claim 1, wherein the application of the solvent-borne coating composition to the mineral wool lowers the temperature of the mineral wool to in the range of 50° C. to 250° C.

13. The method according to claim 1, further comprising applying an effective amount of an antistatic additive to the mineral wool, and/or a dedusting oil to the mineral wool in an amount in the range of 0.4-4% by weight of the mineral wool.

14. The method according to claim 1, wherein the solvent-borne coating composition is an aqueous emulsion comprising the silicone.

15. The method according to claim 14, wherein the silicone is a poly(dimethylsiloxane).

16. A silicone-coated mineral wool comprising a collection of unbound mineral wool fibers having a silicone coating made by the method according to claim 1.

17. An insulated structure having an interior surface, and a silicone-coated mineral wool according to claim 16 disposed against the interior surface.

18. An insulated structure having an interior surface and an exterior surface, and a silicone-coated mineral wool according to claim 16 disposed in and at least partially filling a cavity between the interior surface and the exterior surface.

19. An insulated cavity having an interior surface and an exterior surface, and a silicone-coated mineral wool according to claim 16 disposed in and at least partially filling the cavity between the interior surface and the exterior surface.

* * * * *